United States Patent
Sun et al.

(10) Patent No.: US 11,079,871 B2
(45) Date of Patent: Aug. 3, 2021

(54) DISPLAY PANEL WITH EMBEDDED FINGERPRINT RECOGNITION AND TOUCH FUNCTION, DRIVING METHOD THEREOF AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Shicheng Sun, Beijing (CN); Shuang Hu, Beijing (CN); Chenkai Qi, Beijing (CN); Zhiqiang Wang, Beijing (CN); Jianfei Tian, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/765,953

(22) PCT Filed: Sep. 20, 2019

(86) PCT No.: PCT/CN2019/107073
§ 371 (c)(1),
(2) Date: May 21, 2020

(87) PCT Pub. No.: WO2020/093797
PCT Pub. Date: May 14, 2020

(65) Prior Publication Data
US 2020/0356205 A1 Nov. 12, 2020

(30) Foreign Application Priority Data
Nov. 6, 2018 (CN) .......................... 201811314407.6

(51) Int. Cl.
*G06F 3/041* (2006.01)
*G06K 9/00* (2006.01)
*G09G 3/20* (2006.01)

(52) U.S. Cl.
CPC ........ *G06F 3/0412* (2013.01); *G06F 3/04166* (2019.05); *G06K 9/0002* (2013.01);
(Continued)

(58) Field of Classification Search
CPC .............. G06F 3/0412; G06F 3/04166; G06F 3/04164; G06F 3/0416; G06K 9/0002;
(Continued)

(56) References Cited

U.S. PATENT DOCUMENTS

2010/0013789 A1* 1/2010 Chung .................. G06F 3/0412
345/174
2016/0155409 A1* 6/2016 Jeoung .................. G09G 5/003
345/214

(Continued)

FOREIGN PATENT DOCUMENTS

CN 101320185 A 12/2008
CN 101510037 A 8/2009
(Continued)

OTHER PUBLICATIONS

Chinese Office Action dated Jan. 21, 2020 in related Chinese Application No. 201811314407.6.

*Primary Examiner* — David D Davis
(74) *Attorney, Agent, or Firm* — Arent Fox LLP; Michael Fainberg

(57) ABSTRACT

The present disclosure provides a touch display panel, a driving method thereof and a display device. The touch display panel includes a plurality of touch electrodes distributed in an array and multiplexed as common electrodes, a plurality of scanning lines extending in the row direction (Continued)

of the touch electrodes, a plurality of detection lines extending in the column direction of the touch electrodes, and first control circuits which are in one-to-one correspondence to the touch electrodes. The touch electrodes, the scanning lines, the detection lines and the first control circuits are arranged on a base substrate, each row of the touch electrodes is coupled with one scanning line through the corresponding first control circuit, each column of the touch electrodes is coupled with one detection line through the corresponding first control circuit, and the detection lines and the scanning lines are insulated from each other.

16 Claims, 13 Drawing Sheets

(52) U.S. Cl.
CPC ....... *G09G 3/20* (2013.01); *G09G 2300/0426* (2013.01); *G09G 2300/08* (2013.01); *G09G 2310/0267* (2013.01)

(58) Field of Classification Search
CPC ............. G09G 3/20; G09G 2300/0426; G09G 2300/08; G09G 2310/0267; G09G 2354/00
See application file for complete search history.

(56) References Cited

U.S. PATENT DOCUMENTS

| 2016/0187696 | A1  | 6/2016  | Kim et al. |
| 2016/0189582 | A1* | 6/2016  | Kang ................... G09G 3/3648 345/173 |
| 2016/0224175 | A1* | 8/2016  | Moon ...................... G09G 3/20 |
| 2016/0370904 | A1* | 12/2016 | Wang .................... G02F 1/1368 |
| 2018/0239466 | A1  | 8/2018  | Yan |
| 2019/0227671 | A1  | 7/2019  | Hu et al. |
| 2019/0278455 | A1* | 9/2019  | Li ....................... G06F 3/04166 |

FOREIGN PATENT DOCUMENTS

| CN | 104820321 | A | 8/2015 |
| CN | 104881170 | A | 9/2015 |
| CN | 105094431 | A | 11/2015 |
| CN | 205281443 | U | 6/2016 |
| CN | 106775129 | A | 5/2017 |
| CN | 107515701 | A | 12/2017 |
| CN | 107845646 | A | 3/2018 |
| CN | 109491543 | A | 3/2019 |

* cited by examiner

DISPLAY PANEL WITH EMBEDDED FINGERPRINT RECOGNITION AND TOUCH FUNCTION, DRIVING METHOD THEREOF AND DISPLAY DEVICE

The present disclosure is a US National Stage of International Application No. PCT/CN2019/107073, filed on Sep. 20, 2019, which claims priority to Chinese Patent Application No. 201811314407.6, filed in the Chinese Patent Office on Nov. 6, 2018, and entitled 'Touch Display Panel, Manufacturing Method and Driving Method', the entire contents of which are incorporated herein by reference.

FIELD

The present disclosure relates to the technical field of display, in particular to a touch display panel, a driving method thereof and a display device.

BACKGROUND

Flat panel displays (FPDs) have become the mainstream products in the markets, and there are more and more kinds of flat panel displays, such as a liquid crystal display (LCD), an organic light emitted diode (OLED) display, a plasma display panel (PDP), and a field emission display (FED).

At present, due to rising of a full screen, a fingerprint recognition function is in a quite awkward situation, the screen-to-body ratio of the screen is influenced by designing a fingerprint recognition key on a front surface, fingerprint recognition designed on the back surface is quite inconvenient for users who are habituated to unlocking fingerprints on the front surface, and the experience effect is poor.

SUMMARY

An embodiment of the present disclosure provides a touch display panel which includes:

a common electrode layer, including a plurality of touch electrodes arranged in an array;

a plurality of scanning lines, extending in a row direction of the touch electrodes;

a plurality of detection lines, extending in a column direction of the touch electrodes; and a plurality of first thin film transistors, where the first thin film transistors are in one-to-one correspondence to the touch electrodes, a drain electrode of each of the first thin film transistors is coupled with a corresponding touch electrode, a gate electrode of the each first thin film transistor is coupled with one of the scanning lines, and a source electrode of the each first thin film transistor is coupled with one of the detection lines.

Optionally, the touch display panel further includes a first gate driving circuit coupled with one end of each of the scanning lines, fourth thin film transistors which are in one-to-one correspondence to the scanning lines, a display enable signal line and a common voltage signal line;

where a drain electrode of each of the fourth thin film transistors is coupled with one of the scanning lines, a gate electrode of the each fourth thin film transistor is coupled with the display enable signal line, and a source electrode of the each fourth thin film transistor is coupled with the common voltage signal line.

Optionally, the first gate driving circuit is arranged on a same side of each of the scanning lines, the each fourth thin film transistor is arranged on an other side of the each scanning line, and an extending direction of the display enable signal line and an extending direction of the common voltage signal line are the same as an extending direction of each of the detection lines.

Optionally, the touch display panel further includes a plurality of pixel electrodes distributed in an array, pixel thin film transistors which are in one-to-one correspondence to the pixel electrodes, a plurality of data lines and a plurality of gate lines; where a drain electrode of each of the pixel thin film transistors is coupled with a corresponding pixel electrode, a gate electrode of the each pixel thin film transistor is coupled with one of the gate lines, and a source electrode of the each pixel thin film transistor is coupled with one of the data lines.

Optionally, the touch display panel further includes a second gate driving circuit coupled with one end of each of the gate lines, fifth thin film transistors which are in one-to-one correspondence to the gate lines, and a touch enable signal line;

where a drain electrode of each of the fifth thin film transistors is coupled with one of the gate lines, a gate electrode of the each fifth thin film transistor is coupled with the touch enable signal line, and a source electrode of the each fifth thin film transistor is coupled with the common voltage signal line.

Optionally, the second gate driving circuit and the first gate driving circuit are arranged on a same side of the each scanning line and the each gate line, the each fourth thin film transistor and the each fifth thin film transistor are arranged on an other side of the each scanning line and the each gate line, and an extending direction of the touch enable signal line is the same as an extending direction of each of the detection lines.

Optionally, the first gate driving circuit and the second gate driving circuit are a same gate driving circuit; a second thin film transistor is arranged between the gate driving circuit and the each gate line, and a third thin film transistor is arranged between the gate driving circuit and the each scanning line;

a gate electrode of each of the second thin film transistors is coupled with a first signal source, a source electrode of the each second thin film transistor is coupled with the gate electrode driving circuit, and a drain electrode of the each second thin film transistor is coupled with the gate line; and a gate electrode of each of the third thin film transistors is coupled with a second signal source, a source electrode of the each third thin film transistor is coupled with the gate driving circuit, and a drain electrode of the each third thin film transistor is coupled with the scanning line.

Optionally, the first gate driving circuit and the second gate driving circuit are separately arranged on two sides of each of the scanning lines and each of the gate lines.

Optionally, one touch electrode corresponds to three adjacent pixel electrodes in a row.

Optionally, an extending direction of the gate lines is the same as an extending direction of the scanning lines, the gate lines and the scanning lines are arranged on a same layer, and one of the gate lines and a corresponding scanning line are arranged in a same row gap; and an extending direction of the data lines is the same as an extending direction of the detection lines, and the data lines and the detection lines are arranged on a same layer or the detection lines are arranged on a layer where the data lines are arranged.

Optionally, the layer where the detection lines are arranged is arranged between the layer where the data lines are arranged and the common electrode layer, and one of the detection lines covers a corresponding data line.

Optionally, for one scanning line and a corresponding gate line which are arranged in the same row gap, the touch electrode corresponding to a first thin film transistor coupled with a scanning line and the pixel electrode corresponding to a pixel thin film transistor coupled with a gate line are not overlapped with each other.

The embodiment of the present disclosure also provides a display device which includes the touch display panel provided by the embodiment of the present disclosure.

The embodiment of the present disclosure also provides a driving method of the touch display panel, and the driving method of the touch display panel includes:

in a display stage, switching on each of the first thin film transistors through each of the scanning lines simultaneously, and loading a common voltage signal to each of the touch electrodes through each of the detection lines simultaneously; and in a fingerprint recognition or a touch stage, switching on the each first thin film transistor row by row through the each scanning line, loading a touch signal to each of the touch electrodes through the each detection line, and transmitting a detection signal detected by the each touch electrode to an external circuit.

Optionally, the driving method further includes:

in the display stage, switching on each of the fourth thin film transistors through the display enable signal line simultaneously, and loading a high-level signal to the each scanning line through a common voltage signal line simultaneously; and in the fingerprint recognition or the touch stage, switching off the each fourth thin film transistor through a display enable signal line simultaneously.

Optionally, the driving method further includes:

in the display stage, switching on each pixel thin film transistor row by row through each gate line, and loading a data signal to each pixel electrode through each data line simultaneously; and in the fingerprint identification or the touch stage, switching off the each pixel thin film transistor through the each gate line simultaneously.

Optionally, the driving method further includes:

in the display stage, switching off each fifth thin film transistor through a touch enable signal line simultaneously; and in the fingerprint recognition or the touch stage, switching on the each fifth thin film transistor through the touch enable signal line simultaneously, and loading a low-level signal to the each gate line through the common voltage signal line simultaneously.

Optionally, the driving method further includes:

in the display stage, switching on each second thin film transistor through a first signal source simultaneously, and switching off each third thin film transistor through a second signal source simultaneously; and in the fingerprint recognition or the touch stage, switching off the each second thin film transistor through the first signal source simultaneously, and switching on the each third thin film transistor through the second signal source simultaneously.

DETAILED DESCRIPTION OF THE EMBODIMENTS

Figure 1:
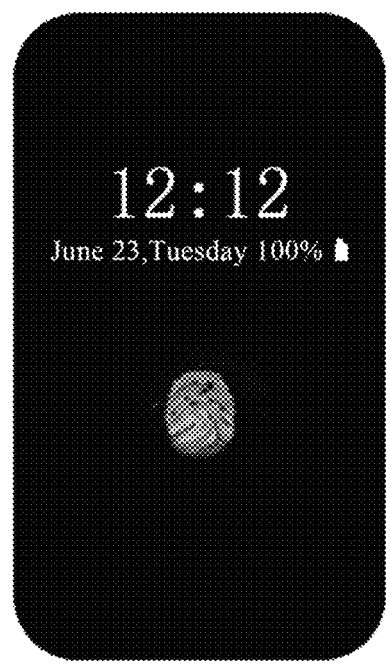
FIG. 1 is a schematic structural diagram of a touch display panel with a fingerprint recognition function in the related art.

Referring to FIG. 1, although fingerprint recognition is arranged on the front surface of a display screen in the related art, the fingerprint recognition is only arranged on the upper portion of the screen, the integration level is low, and the manufacturing cost is high.

In order to make the purposes, technical solutions and advantages of the embodiments of the present disclosure more clear, the technical solutions of the embodiments of the present disclosure will be described clearly and completely in conjunction with accompanying drawings of the embodiments of the present disclosure. It is clear that the described embodiments are only a part of embodiments of the present disclosure, not all embodiments of the present disclosure. All other embodiments obtained by those of ordinary skill in the art based on the described embodiments of the present disclosure without creative efforts shall fall within the scope of protection of the present disclosure.

Unless defined otherwise, technical or scientific terms used in the present disclosure should be of the ordinary meaning understood by those of ordinary skill in the art to which the present disclosure belongs. The terms 'first', 'second' and similar terms used in the present disclosure do not denote any order, quantity or importance, but rather are used solely to distinguish one from another. The word 'comprising' or 'includes' and the like, means that an element or article that precedes the word is inclusive of an element or article listed after the word and equivalents thereof, but does not exclude other elements or articles. The terms 'connecting' or 'connected' and similar terms, are not limited to physical or mechanical connections, but may include electrical couplings, regardless of direct or indirect. The terms 'upper', 'lower,' 'left', 'right', and the like are used merely to indicate a relative positional relationship that may change accordingly when the absolute position of a described object changes.

In order to keep the following description of the embodiments of the present disclosure clear and concise, detailed descriptions of known functions and known components are omitted from the present disclosure.

Figure 2:
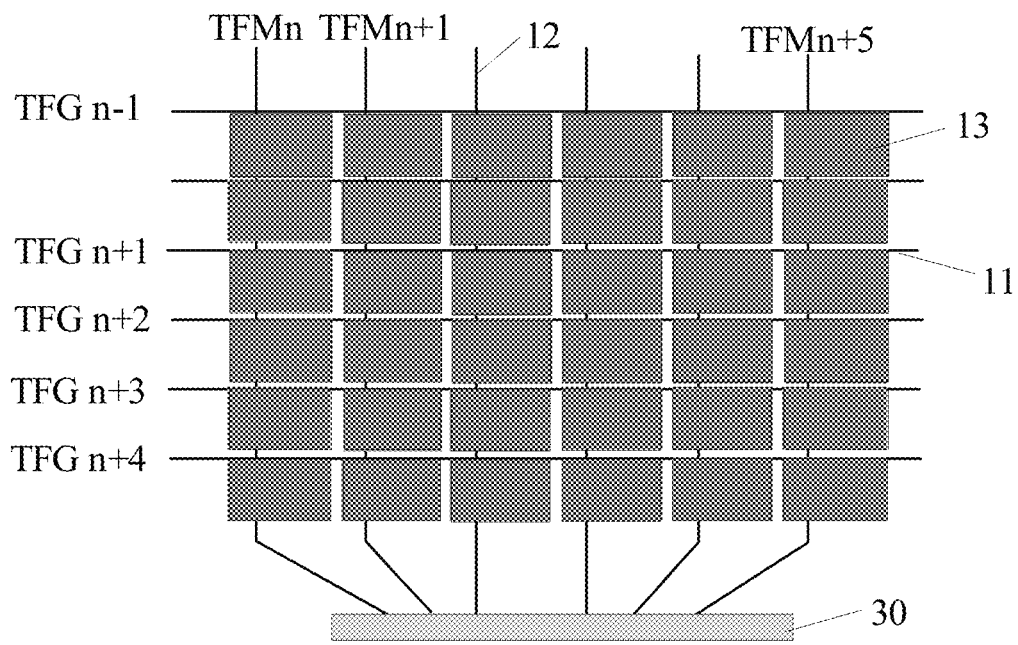
FIG. 2 is a schematic structural diagram of a touch display panel provided by the embodiment of the present disclosure.
Figure 3:
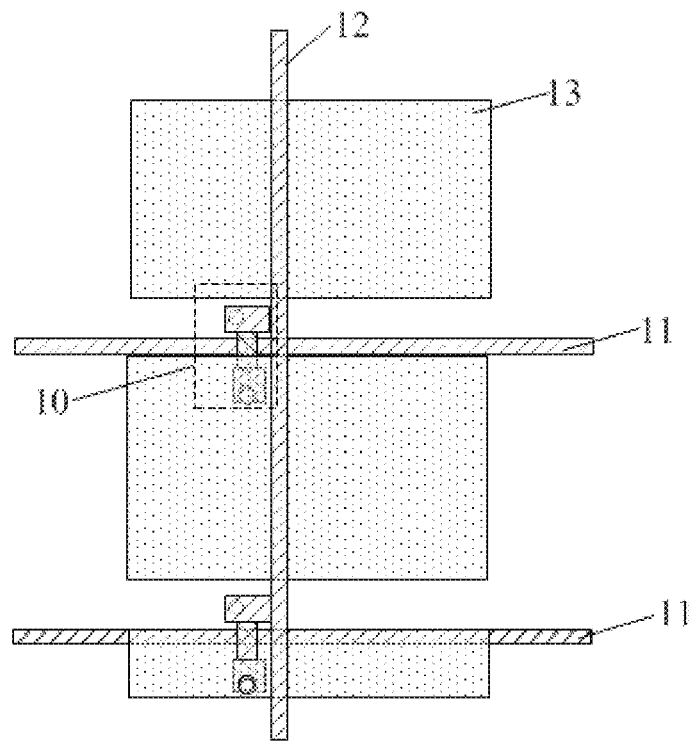
FIG. 3 is an enlarged schematic structural diagram of the touch display panel at the position of a touch electrode according to the embodiment of the present disclosure.

Referring to FIG. 2 and FIG. 3, where FIG. 3 is a partially enlarged schematic structural diagram of FIG. 2, an embodiment of the present disclosure provides a touch display panel, the touch display panel includes a plurality of touch electrodes 13, a plurality of scanning lines 11 (namely TFG), a plurality of detection lines 12 (namely TFM) and first control circuits; the touch electrodes 13, the scanning lines 11, the detection lines 12 and the first control circuits are arranged on a base substrate; and the touch electrodes 13 are distributed in an array and multiplexed as common electrodes, namely, the touch electrodes 13 constitute a common electrode layer, the scanning lines 11 extend in a row direction of the touch electrodes 13, the detection lines 12 extend in a column direction of the touch electrodes 13, and the first control circuits are in one-to-one correspondence to the touch electrodes 13; where each row of touch electrodes 13 is coupled with one scanning line 11 through the corresponding first control circuit, each column of touch electrodes 13 is coupled with one detection line 12 through the corresponding first control circuit, the detection line 12 and the scanning line 11 are insulated from each other, and the first control circuits can be specifically first thin film transistors 10.

when the scanning lines 11 are used for displaying, a first control signal is input to the first control circuits, and when the first control signal is input to the first control circuits, the detection lines 12 input a common voltage signal to the touch electrodes 13 through the first control circuits; and the scanning lines 11 are used for inputting a second control signal to the first control circuits row by row during fingerprint recognition or touch, and the detection lines 12 input a touch signal to the touch electrodes 13 through the first control circuits and transmit a detection signal detected by the touch electrodes 13 to an external circuit when the second control signal is input to the first control circuits; for example, the external circuit may be an integrated circuit (IC) 30 specifically.

During displaying of the touch display panel provided by the embodiment of the present disclosure, the touch electrodes can be used as common electrodes; during fingerprint recognition or touch, the scanning lines input the second control signal to the first control circuits row by row; when the second control signal is input to the first control circuits, the detection lines input a touch signal to the touch electrodes, namely, the touch electrodes are charged row by row; and when a user touches the touch display panel with fingers, the signal of the touch electrodes changes, and the changed signal is transmitted to the external circuit through the detection lines, thus, a touch position can be determined and a fingerprint pattern can further be determined according to the column where the touch electrodes with signal changing are located and the row of the scanned touch electrodes corresponding to the time when the signal changes, fingerprint recognition and touch are integrated in the display panel, and the integration level is high.

In specific implementation, each first control circuit may include a first thin film transistor 10, a gate electrode of each first thin film transistor 10 is coupled with one scanning line 11, a source electrode of each first thin film transistor 10 is coupled with one detection line 12, and a drain electrode of each first thin film transistor 10 is coupled with the corresponding touch electrode 13. Of course, the first control circuits may be other circuit structures, and by the circuit structures, when the scanning lines 11 input the first control signal to the circuit structures, the common voltage signal of the detection lines 12 can be applied to the touch electrodes 13, and when the scanning lines 11 input the second control signal to the circuit structures, the touch signal of the detection lines 12 is applied to the touch electrodes 13. In the embodiment of the present disclosure, the first control circuits adopt the first thin film transistors, so that the structures of the first control circuits can be simplified, and the structure of the touch display panel can further be simplified.

Figure 4:
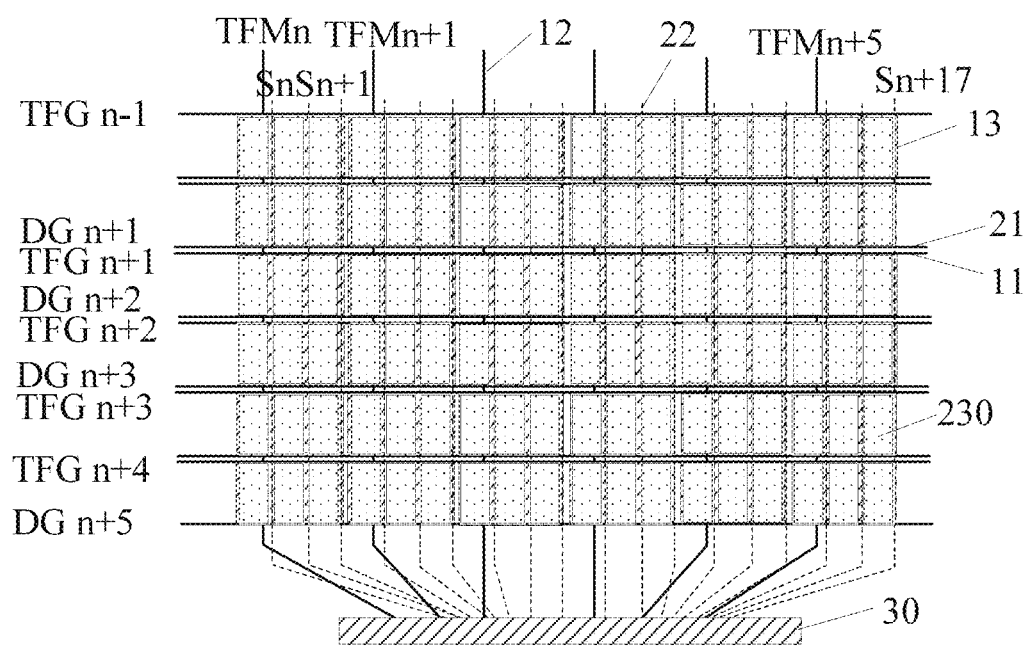
FIG. 4 is another schematic structural diagram of the touch display panel according to the embodiment of the present disclosure.
Figure 5:
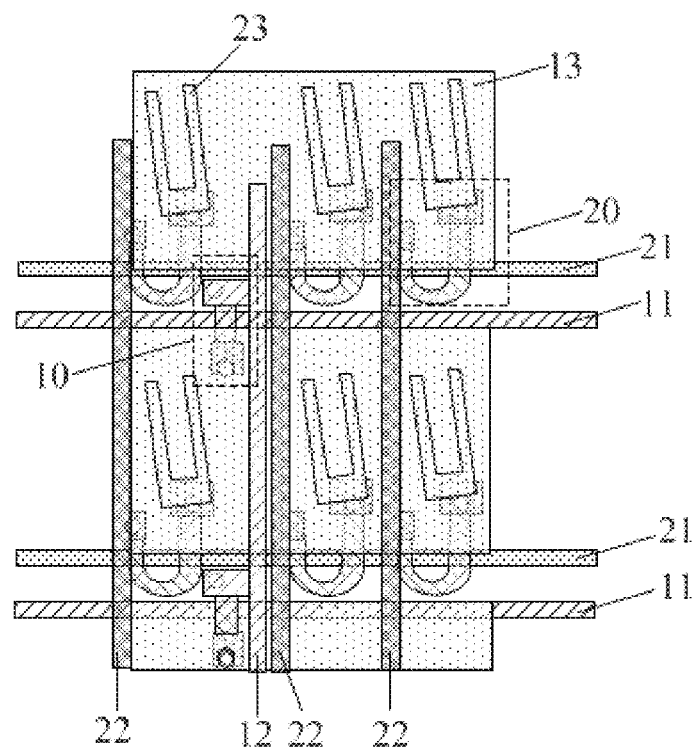
FIG. 5 is a top view of the touch display panel in which detection lines and data lines are arranged on the same layer according to the embodiment of the present disclosure.
Figure 6:
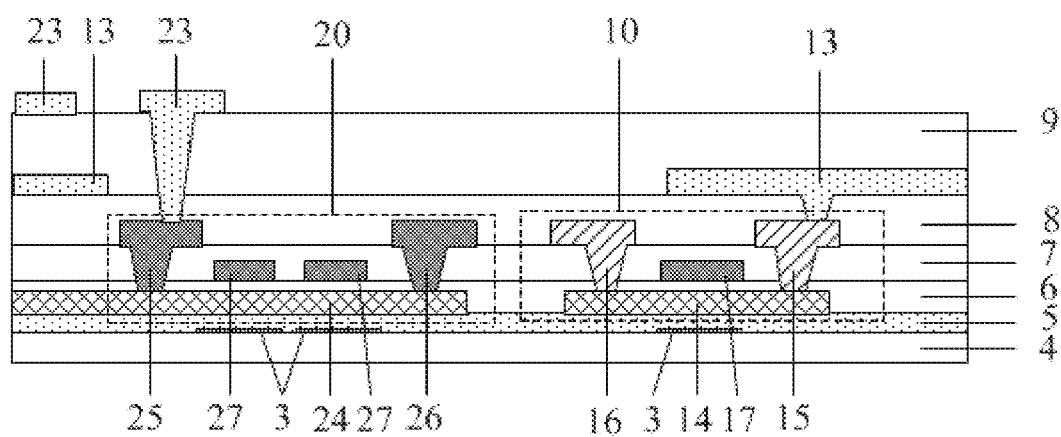
FIG. 6 is a sectional structural view of the touch display panel in which the detection lines and the data lines are arranged on the same layer according to the embodiment of the present disclosure.

In specific implementation, referring to FIG. 4 to FIG. 6, the touch display panel generally includes a plurality of pixel units which are distributed in an array, each pixel unit may specifically include at least three sub-pixel units 230, each sub-pixel unit 230 may specifically include a pixel thin film transistor 20 and a pixel electrode 23, namely, each pixel unit at least includes three pixel thin film transistors 20, where various film layers of the first thin film transistors 10 and the various corresponding film layers of the pixel thin film transistors 20 are arranged on the same layer correspondingly. For example, a thin film transistor generally includes a gate electrode, a gate insulating layer, an active layer and a source and drain electrode layer, while in the embodiment of the present disclosure, the gate electrode 17 of each first thin film transistor and the gate electrode 27 of the corresponding pixel thin film transistor are arranged on a same layer, the active layer 14 of each first thin film transistor and the active layer 24 of the corresponding pixel thin film transistor are arranged on a same layer, the source electrode 16 of each first thin film transistor and the source electrode 26 of the corresponding pixel thin film transistor are arranged on a same layer, and the drain electrode 15 of each first thin film transistor and the drain electrode 25 of the corresponding pixel thin film transistor are arranged on a same layer. In the embodiment of the present disclosure, and the various film layers of the first thin film transistors 10 and the various corresponding film layers of the pixel thin film transistors 20 are arranged on the same layer correspondingly, so that a manufacturing process for manufacturing the touch display panel with high integration level can be simplified.

In specific implementation, the size of the touch electrode 13 may be the same as the size of the pixel unit, namely, one touch electrode 13 may correspond to three adjacent pixel electrodes 23 in a row. Because the precisions required by touch and display are different, a traditional touch control electrode is generally large, the number of touch electrodes per inch is small, and the number of recognition units per inch required by fingerprint recognition is more than 280, that is, the general touch electrode cannot be used for fingerprint recognition. In the embodiment the present disclosure, the size of the touch electrode is the same as the size of the pixel unit, so that the number of the touch electrodes per inch can reach 400 or above, and the precision requirement of fingerprint recognition can be met. If the size of the touch electrode is larger than the size of the pixel unit, the precision required by fingerprint recognition may not be met, and if the size of the touch electrode is smaller than the size of the pixel unit, more scanning lines and detection lines are needed, and the wiring complexity of the touch display panel is increased.

Figure 7:
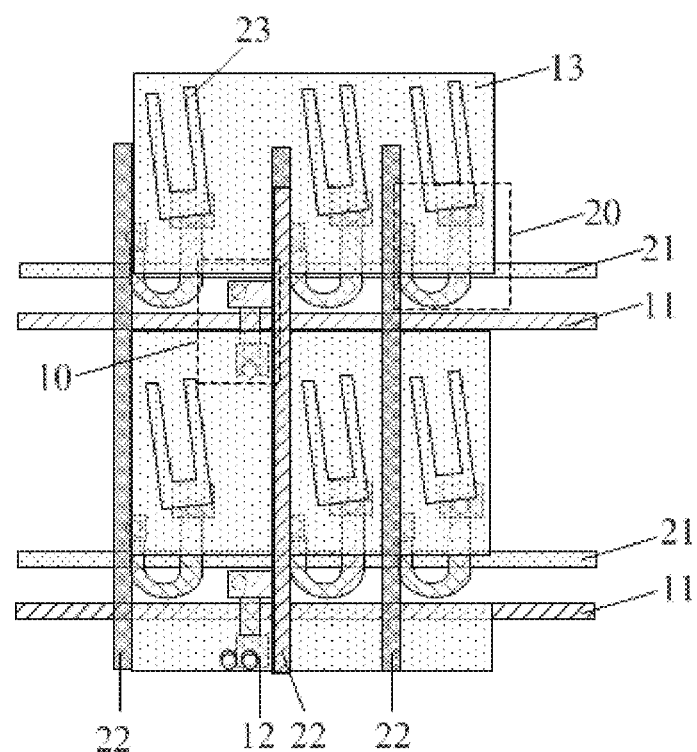
FIG. 7 is a top view of the touch display panel in which the detection lines are located on the data lines according to the embodiment of the present disclosure.
Figure 8:
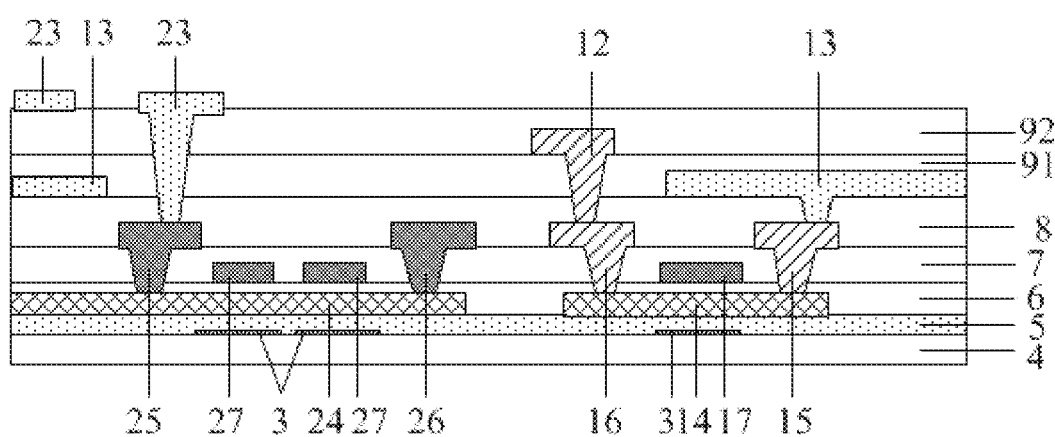
FIG. 8 is a sectional structural view of the touch display panel in which the detection lines are located on the data lines according to the embodiment of the present disclosure.

In specific implementation, referring to FIG. 4 to FIG. 8, the touch display panel includes gate lines 21 (namely DGate, which may include, for example, DGn, DGn+1, DGn+2, DGn+3, DGn+4 and DGn+5) extending in the row direction of the pixel units, and data lines 22 (namely S, which may include, for example, Sn, Sn+1 and Sn+17) extending in the column direction of the pixel units; for the specific positions where the scanning lines 11 (namely TFG, which may specifically include, for example, TFGn, TFGn+1, TFGn+2, TFGn+3 and TFGn+4) and the detection lines 12 (namely TFM, which may include, for example, TFMn, TFMn+1 and TFMn+5) are arranged, the scanning lines 11 and the gate lines 21 may be arranged on the same layer in parallel, that is, the scanning lines 11 and the gate lines 21 are arranged on the same layer, the extending direction of the scanning lines 11 is the same as the extending direction of the gate lines 21, and generally, a gate line 21 and a corresponding scanning line 11 are positioned in the same row gap. In addition, as shown in FIG. 5 and FIG. 7, for one scanning line 11 and one gate line 21 which are located in the same row gap, the touch electrode 13 corresponding to the first thin film transistor 10 coupled with the scanning line 11 and the pixel electrode 23 corresponding to the pixel thin film transistor 20 coupled with the gate line 21 are not overlapped with each other, that is, the gate line 21 is coupled with the pixel electrode 23 on the upper side, and the scanning line 11 is coupled with the touch electrode 13 on the lower side. The detection lines 12 (the source electrodes 16 of the first thin film transistors are coupled with the detection lines 12) and the data lines 22 (the source electrodes 26 of the pixel thin film transistors are coupled with the data lines 22) are arranged on the same layer and extend in the same direction, as shown in FIG. 5 and FIG. 6; or the detection lines 12 are located on the layer where the data lines 22 (the source electrodes 26 of the pixel thin film transistors are coupled with the data lines 22) are located, as shown in FIG. 7 and FIG. 8. In the embodiment of the present disclosure, the scanning lines 11 and the gate lines 21 are arranged on the same layer in parallel, and the detection lines 12 and the data lines 22 are arranged on the same layer in parallel, so that the wiring structure of the touch display panel with high integration level can be simplified, and the touch display panel has a simplified wiring structure while integrating touch and fingerprint identification inside. When the layer where the detection lines 12 are located is located between the layer where the data lines 22 are located and the common electrode layer (namely the layer where the touch electrodes 13 are located), as shown in FIG. 7, one detection line 12 can cover one corresponding data line 22.

In specific implementation, referring to FIG. 8, the touch display panel generally further includes a base substrate 4, light shielding layers 3 located on the base substrate 4, a buffer layer 5 located on the light shielding layers 3, an active layer located on the buffer layer, a gate insulating layer 6 located on the active layer, a gate electrode layer located on the gate insulating layer 6, an interlayer dielectric layer 7 located on the gate electrode layer, source and drain electrode layers located on the interlayer dielectric layer 7, a flat layer 8 located on the source and drain electrode layers, a common electrode layer located on the flat layer 8, a first passivation layer 91 located on the common electrode layer, a detection line 12 located on the first passivation layer 91, a second passivation layer 92 located on the detection line 12, and a pixel electrode layer located on the second passivation layer 92, where the active layer includes an active layer 14 of the first thin film transistor and an active layer 24 of the pixel thin film transistor, the gate electrode layer includes a gate electrode 17 of the first thin film transistor and a gate electrode 27 of the pixel thin film transistor, the pixel thin film transistor can be of a two-gate structure specifically, and the source and drain electrode layers include a source electrode 16 of the first thin film transistor, a drain electrode 15 of the first thin film transistor, a source electrode 26 of the pixel thin film transistor, a drain electrode 25 of the pixel thin film transistor, and the data line 22 (not shown). The above merely illustrates the structures of different layers of the touch display panel in which the detection lines 12 are located on the layer where the data lines 22 are located, as shown in FIG. 6, when the detection lines 12 and the data lines 22 are arranged on the same layer, only one passivation layer 9 may be arranged above the touch electrodes 13.

Figure 9:
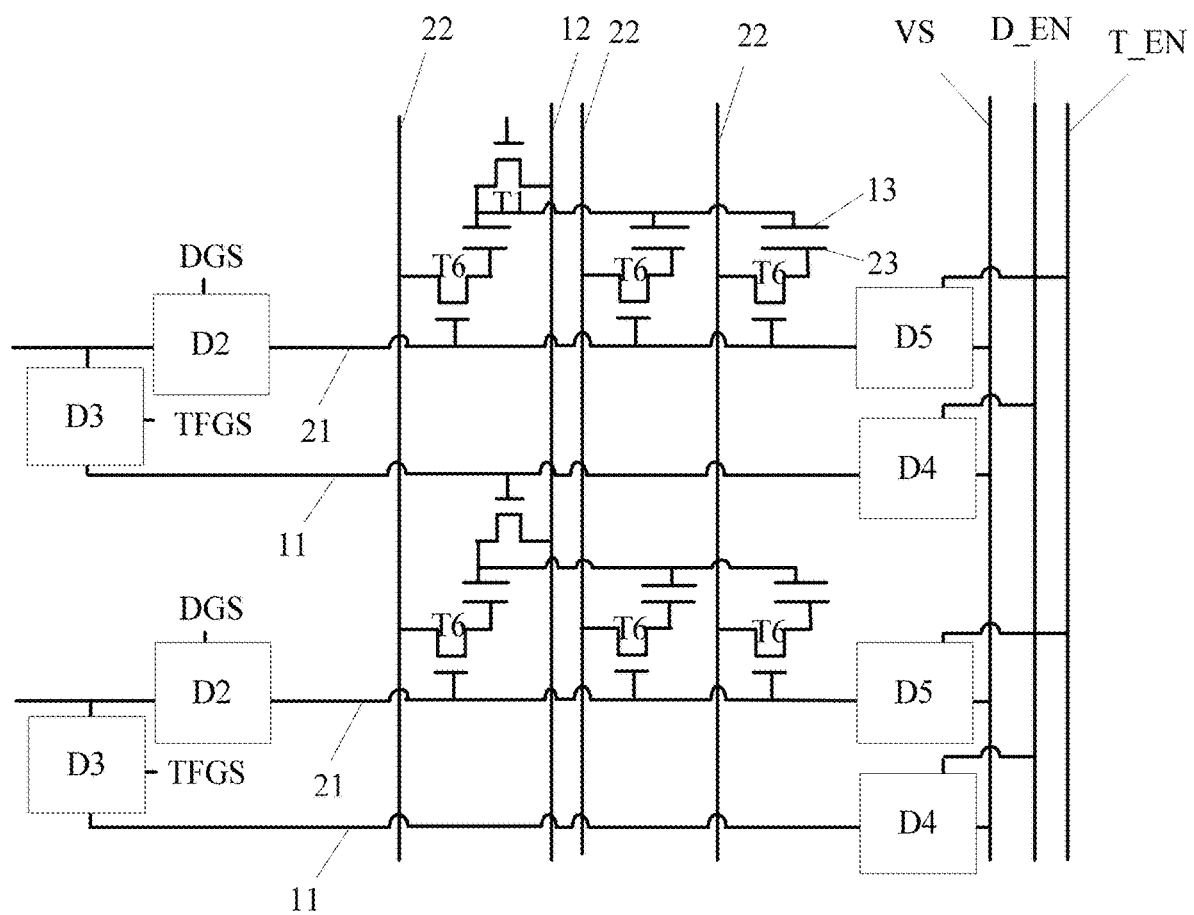
FIG. 9 is a schematic diagram of a circuit structure of the touch display panel in which scanning lines and gate lines are driven by the same gate driving circuit according to the embodiment of the present disclosure.

In specific implementation, the touch display panel may be provided with only one gate driving circuit. When the touch display panel is provided with one gate driving circuit, the gate lines 21 and the scanning lines 11 can be driven by the gate driving circuit. Specifically, in order to more clearly illustrate the arrangement mode in which the gate lines 21 and the scanning lines 11 are driven by the same gate driving circuit, a circuit structure diagram shown in FIG. 9 is used for illustrating the arrangement mode. As shown in FIG. 9, the touch display panel includes touch electrodes 13, pixel electrodes 23, scanning lines 11, detection lines 12, gate electrodes 21 and data lines 22, the touch electrodes 13 are coupled with the scanning lines 11 and the detection lines 12 through the first thin film transistors T1 (namely the first thin film transistors 10 in the structural diagram of FIG. 5). Specifically, the gate electrode of each of the first thin film transistors T1 is coupled with a scanning line 11, the source electrode is coupled with a detection line 12, and the drain electrode is coupled with a touch electrode 13. Each pixel unit includes three pixel thin film transistors T6 (namely the pixel thin film transistors 20 in the structural diagram of FIG. 5), where the gate electrode of each of the pixel thin film transistors T6 is coupled with a gate line 21, the source electrode is coupled with a data line 22, and the drain electrode is coupled with a pixel electrode 23. A second control circuit D2 is arranged between the gate driving circuit (not shown) and each gate line 21, and each second control circuit D2 is used for providing a signal of the gate driving circuit to the corresponding gate line 21 during displaying; a third control circuit D3 is arranged between the gate driving circuit and each scanning line 11, and each third control circuit D3 is used for providing a signal of the gate driving circuit to the corresponding scanning line 11 in the stage of fingerprint recognition or touch. In the embodiment of the present disclosure, each second control circuit D2 is arranged between the corresponding gate line 21 and the gate driving circuit, each third control circuit D3 is arranged between the corresponding scanning line 11 and the gate driving circuit, so that the gate driving circuit can drive the gate lines 21, and the gate driving circuit can also drive the scanning lines 11 without separately arranging a driving circuit for driving the scanning lines 11.

Figure 10:
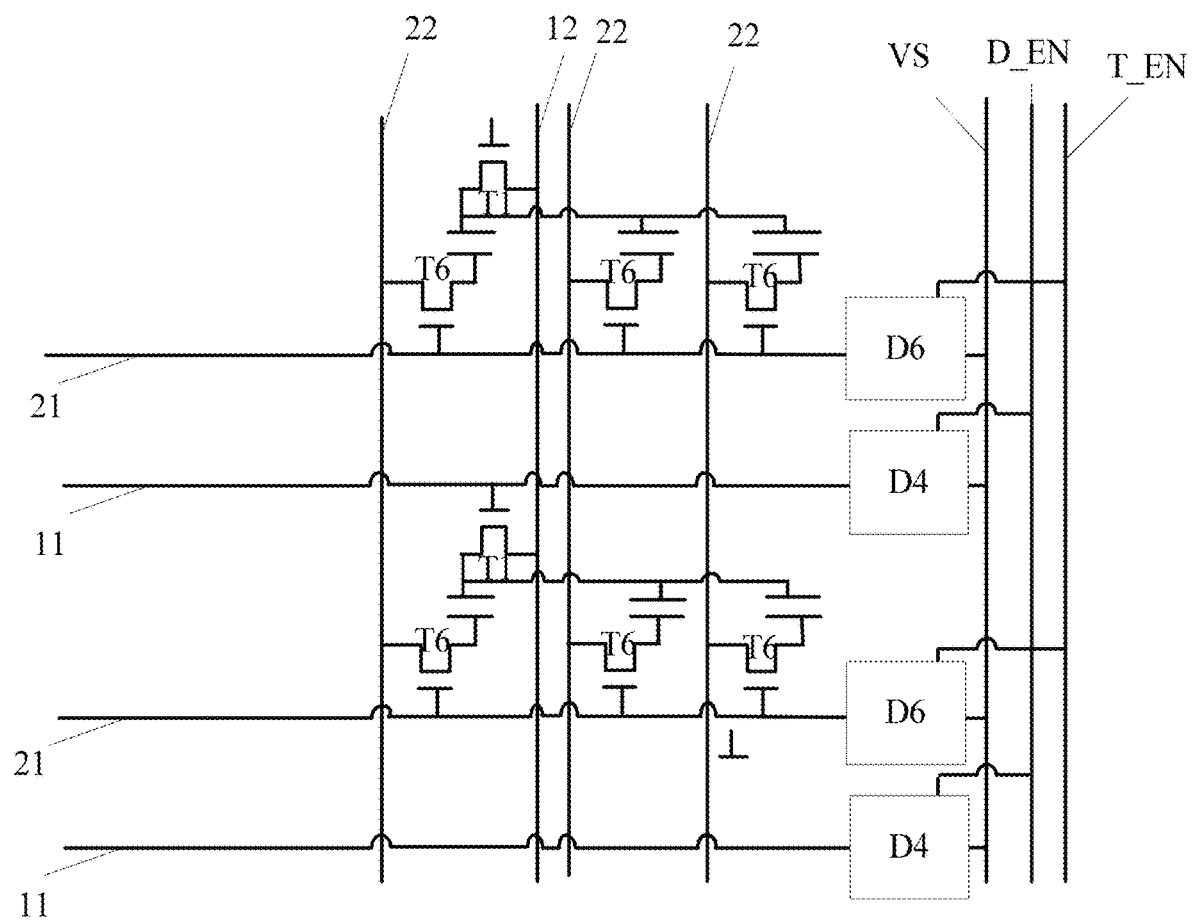
FIG. 10 is a schematic diagram of a circuit structure of the touch display panel in which the scanning lines and the gate lines are driven by different gate driving circuits according to the embodiment of the present disclosure.

Of course, in specific implementation, the touch display panel may also be provided with two gate driving circuits, and the gate lines 21 and the scanning lines 11 are driven by the different gate driving circuits. That is, the gate lines 21 are driven by a second gate driving circuit, and the scanning lines 11 are driven by a first gate driving circuit to form a two-GOA-circuit-driven two-Gate structure. When the gate lines 21 are driven by the second gate driving circuit and the scanning lines 11 are driven by the first gate driving circuit, as shown in FIG. 10, the gate lines 21 may be directly coupled with the second gate driving circuit (not shown), a second control circuit is not required; the scanning lines 11 are directly coupled with the first gate driving circuit (not shown), and a third control circuit is not required. In addition, the first gate driving circuit and the second gate driving circuit may be separately arranged on two sides of each of the scanning lines 11 and each of the gate lines 21, and may also be arranged on the same side, and it is not limited thereto.

In specific implementation, the gate driving circuit is arranged on one side of each scanning line 11 (for example, the gate driving circuit is arranged on the left side of each scanning line 11), and the touch display panel is further provided with a display enable signal line D_EN (Display EN) and a common voltage signal line VS which extend in the column direction of the touch electrodes 13 on the side opposite to the gate driving circuit, referring to FIG. 9 and FIG. 10, the other side (the right side of each scanning line 11 as shown in FIG. 9) of each scanning line 11 is coupled with the common voltage signal line VS through a fourth control circuit D4, and the fourth control circuits D4 are also coupled with the display enable signal line D_EN; when used for displaying, the display enable signal line D_EN is used for inputting a display enable signal to the fourth control circuits D4, and the common voltage signal line VS is used for inputting the common voltage signal to the scanning lines 11 through the fourth control circuits D4 when the display enable signal D_EN is input to the fourth control circuits D4. In the embodiment of the present disclosure, the touch display panel is further provided with the common voltage signal line VS, and each scanning line 11 is coupled with the common voltage signal line VS through the corresponding fourth control circuit D4, and thus, during displaying, the common voltage signal can be put into the touch electrodes 13 to meet displaying requirements.

In specific implementation, the touch display panel is provided with a touch enable signal line T_EN (Touch EN) extending along the column direction of the touch electrodes on the side opposite to the gate driving circuit, the other side of each gate line 21 is coupled with the common voltage signal line VS through a fifth control circuit D5, and the fifth control circuit D5 is also coupled with the touch enable signal line T_EN; the touch enable signal line T_EN is used for inputting a touch enable signal to the fifth control circuits D5 during touch, and the common voltage signal line VS is used for inputting a low-level signal to the gate lines 21 through the fifth control circuits D5 when the touch enable signal is input to the fifth control circuits D5 so as to switch off the pixel thin film transistors in the row. In the embodiment of the present disclosure, the other side of the gate line 21 is further coupled with the common voltage signal line VS through the fifth control circuit D5, so that the low-level signal can be input to the common voltage signal line VS during touch or fingerprint recognition, the pixel thin film transistors T6 of all the pixel units coupled with gate lines 21 in the row can be pulled down, and with respect to all the pixel thin film transistors T6 in the row, normal display of the touch display panel during touch or fingerprint recognition is prevented from being affected during touch or fingerprint recognition and electrical leakage of the pixel electrodes 23.

Figure 11:
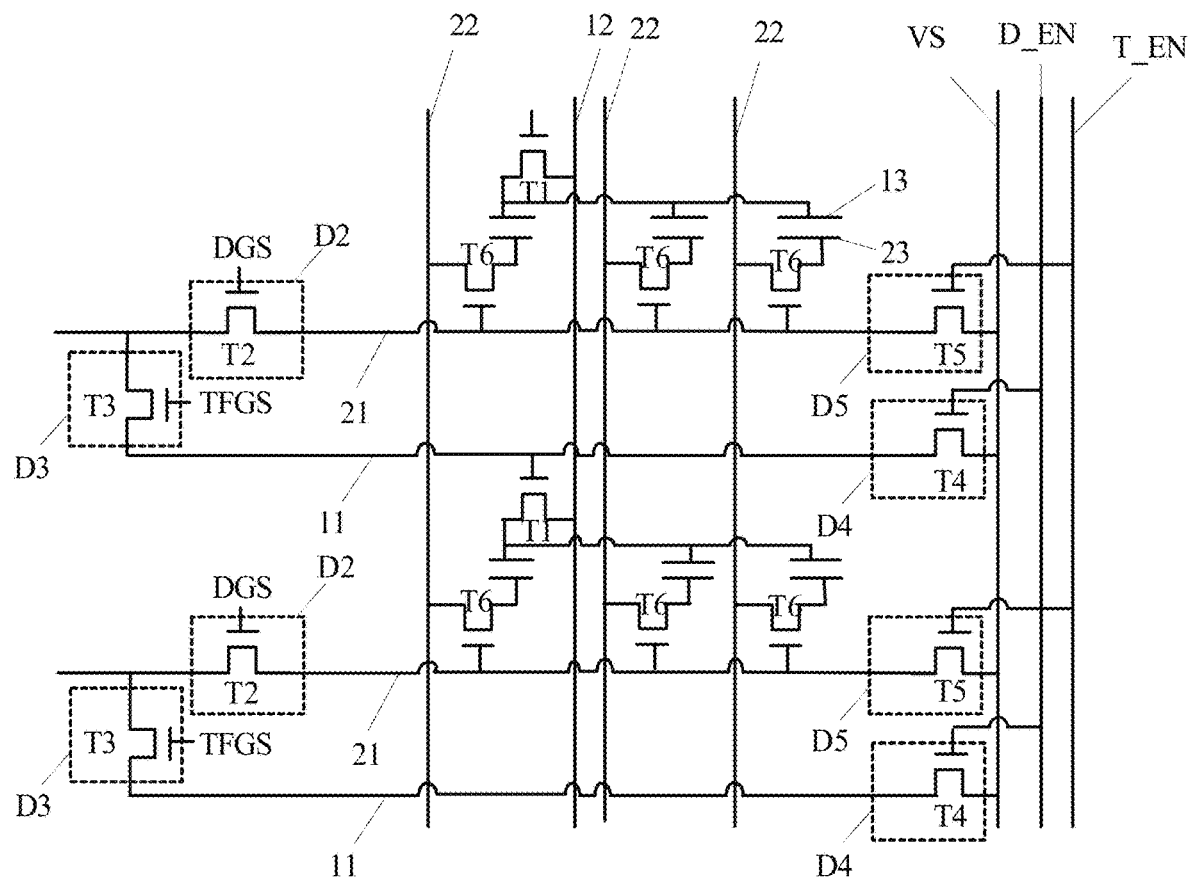
FIG. 11 is a schematic diagram of a specific circuit structure of the touch display panel in which the scanning lines and the gate lines are driven by the same gate driving circuit according to the embodiment of the present disclosure.

Specifically, referring to FIG. 11, each second control circuit D2 may include a second thin film transistor T2, the gate electrode of the each second thin film transistor T2 is coupled with a first signal source DGS (Display Gate Switch), the source electrode is coupled with the gate driving circuit, and the drain electrode is coupled with a gate line 21; and each third control circuit D3 includes a third thin film transistor T3, the gate electrode of the each third thin film transistor is coupled with a second signal source TFGS (Touch Fingerprint Gate Switch), the source electrode is coupled with the gate driving circuit, and the drain electrode is coupled with a scanning line 11. Of course, the second control circuit D2 may be circuit lasers other than the second thin film transistor T2, and similarly, the third control circuit D3 may be circuit structures other than the third thin film transistor T3. In the embodiment of the present disclosure, each second control circuit D2 includes a second thin film transistor T2, each third control circuit D3 includes a third thin film transistor T3, so that the structures of the second control circuit D2 and the third control circuit D3 can be simplified, and the circuit structure of the touch display panel is further simplified. Of course, FIG. 9 to FIG. 11 are merely examples of a row of gate lines provided with three pixel thin film transistors, and the present disclosure is not limited thereto.

Specifically, each fourth control circuit D4 may include a fourth thin film transistor T4, the gate electrode of the each fourth thin film transistor T4 is coupled with the display enable signal line D_EN, the source electrode is coupled with the common voltage signal line VS, and the drain electrode is coupled with a scanning line 11. Of course, the fourth control circuit D4 may be other circuit structures. In the embodiment of the present disclosure, each fourth control circuit D4 includes a fourth thin film transistor T4, so that the structures of the fourth control circuit D4 can be simplified, and the circuit structure of the touch display panel is simplified.

Specifically, each fifth control circuit D5 includes a fifth thin film transistor T5, the gate electrode of the each fifth thin film transistor T5 is coupled with the touch enable signal line T_EN, the source electrode is coupled with the common voltage signal line VS, and the drain electrode is coupled with a gate line 21. Of course, the fifth control circuit D5 may also be other circuit structures. In the embodiment of the present disclosure, each fifth control circuit includes a fifth thin film transistor, so that the structures of the fifth control circuit can be simplified, and the circuit structure of the touch display panel is further simplified.

Based on the same inventive concept, the embodiment of the present disclosure also provides a display device which includes any touch display panel provided by the embodiment of the present disclosure. The principle solving problems of the display device is similar to the principle of the touch display panel, thus, the implementation of the display device can be seen in the implementation of the touch display panel, and repeated description is omitted here.

Based on the same inventive concept, the embodiment of the present disclosure also provides a driving method of the touch display panel provided by the embodiment of the present disclosure, and the driving method includes:

in a display stage, a first control signal is input to the first control circuits through the scanning lines, and a common voltage signal is input to the touch electrodes through the first control circuits when the first control signal is input to the first control circuits; namely the first thin film transistors are simultaneously switched on through the scanning lines, and a common voltage signal is loaded to the touch electrodes simultaneously through the detection lines; and in a fingerprint recognition or touch stage, a second control signal is input to the first control circuits by the scanning lines row by row, a touch signal is input to the touch electrodes through the first control circuits by the detection lines when the second control signal is input to the first control circuits, and a detection signal detected by the touch electrodes is transmitted to an external circuit; namely the first thin film transistors are switched on row by row through the scanning lines, the touch signal is loaded to the touch electrodes through the detection lines, and the detection signal detected by the touch electrodes is transmitted to the external circuit.

Optionally, when the touch display panel provided by the embodiment of the present disclosure includes the fourth thin film transistors coupled with the scanning lines, the driving method provided by the embodiment of the present disclosure further includes:

in the display stage, the fourth thin film transistors are simultaneously switched on through the display enable signal line, and a high-level signal is loaded to the scanning lines simultaneously through the common voltage signal line so that the first thin film transistors are simultaneously switched on through the scanning lines; and in the fingerprint recognition or touch stage, the fourth thin film transistors are simultaneously switched off through the display enable signal line.

Optionally, when the touch display panel provided by the embodiment of the present disclosure includes the pixel thin film transistors coupled with the pixel electrodes, the driving method provided by the embodiment of the present disclosure further includes:

in the display stage, the pixel thin film transistors are switched on row by row through the gate lines, and a data signal is loaded to the pixel electrodes simultaneously through the data lines; and in the fingerprint recognition or touch stage, the pixel thin film transistors are simultaneously switched off through the gate lines, so that the problem that normal display cannot be achieved during touch or fingerprint recognition due to electrical leakage of the pixel electrodes is solved.

Optionally, when the touch display panel provided by the embodiment of the present disclosure includes fifth thin film transistors coupled with the gate lines, the driving method provided by the embodiment of the present disclosure further includes:

in the display stage, the fifth thin film transistors are simultaneously switched off through the touch enable signal line; and in the fingerprint recognition or touch stage, the fifth thin film transistors are simultaneously switched on through the touch enable signal line, and the low-level signal is loaded to the gate lines simultaneously through the common voltage signal line.

Optionally, when the gate lines and the scanning lines in the touch display panel provided by the embodiment of the present disclosure are coupled with the same gate driving circuit, the driving method provided by the embodiment of the present disclosure further includes:

in the display stage, the second thin film transistors are simultaneously switched on through the first signal source, and the third thin film transistors are simultaneously switched off through the second signal source; and in the fingerprint recognition or touch stage, the second thin film transistors are simultaneously switched off through the first signal source, and the third thin film transistors are simultaneously switched on through the second signal source.

In order to more clearly understand a driving principle provided by the embodiment of the present disclosure, for example, the gate lines 21 and the scanning lines 11 are driven by the same gate driving circuit, and the following detailed description is made in conjunction with FIG. 11:

during displaying, a DGS is in high level, a TFGS is in low level, T2 is switched on, T3 is switched off, each pixel thin film transistor T6 coupled with the gate line 21 (namely DG) is switched on, and a signal of each data line 22 can be input to the corresponding pixel electrode 23. D_EN is in high level, T_EN is in low level, VS is in high level, T4 is switched on, T5 is switched off, at the moment, each scanning line 11 (namely TFG) is filled with the high level by T4, T1 is switched on, a VCOM voltage is input to each detection line 12 (namely TFM), and the touch electrode 13 (C-ITO) blocks have the VCOM voltage, namely displaying time.

At the time of touch or fingerprint recognition, DGS is in low level, TFGS is in high level, T2 is switched off, and T3 is switched on. D_EN is in low level, T4 is switched off, and the voltage on each scanning line 11 (TFGate) is input by the gate driving circuit (GOA) at the moment. T_EN is in high level, T5 is switched on, the low level is input to VS, the low level is input to each gate line 21, a pixel area DG is pulled down, each pixel thin film transistors T6 on the row is switched off, the problem that normal display cannot be achieved during touch or fingerprint recognition due to electric leakage of the pixel electrodes 23 is prevented, and the circumstance that touch and fingerprint recognition are affected by other TFT structures during charging of the touch electrodes is avoided. The scanning lines 11 are scanned row by row, at the time t1, the scanning line 11 (namely TFG) on the nth row is pulled up, all T1s on the nth row are switched on, and each touch electrode block on the nth row is charged by the detection line 12 (namely TFM); at the time t2, the scanning line 11 (namely TFG) in the (n+1)th row is pulled up, all T1s on the (n+1)th row are switched on, each touch electrode block on the (n+1)th row is charged by the detection line 12 (namely TFM), similarly, at the time of t3, t4 . . . , the touch electrode blocks on the (n+2)th row, the (n+3)th row . . . can be sequentially charged, and during touch or fingerprint recognition, when the user touches the screen with fingers, the detection lines 12 (namely TFM) send back change of quantity of electric charge of the touch electrode blocks on the different rows of an IC to form a whole-surface reporting structure for recognizing touch or fingerprint recognition.

The voltages input to the various signal lines can be seen in Table 1 below

TABLE 1

|  | DGS | TFGS | VS | D_EN | T_EN | Detection line (TFM) |
| --- | --- | --- | --- | --- | --- | --- |
| Display | 8 V | −8 V | 5 V | 8 V | −8 V | −200~500 mV |
| Touch | −8 V | 8 V | −8 V | −8 V | 8 V | ≈1.8 V |
| Fingerprint recognition | −8 V | 8 V | −8 V | −8 V | 8 V | TBD |

Figure 12:
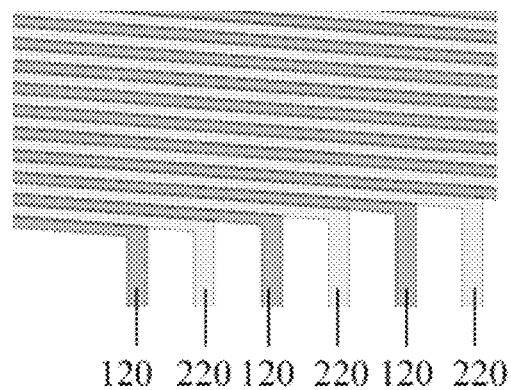
FIG. 12 is a schematic diagram of a circuit wiring structure of a fan-out area in the touch display panel according to the embodiment of the present disclosure.

In specific implementation, for a wiring design of a fan-out area, referring to FIG. 12, namely a wiring area which couples an AA area signal line with an (IC, the area is provided with coupling lines 120 of detection lines which couple detection lines 12 of the display area with the IC, and the area is also provided with coupling lines 220 of data lines which couple data lines 22 of the display area with the IC, and the coupling lines 120 of detection lines and the coupling lines 220 of data lines are located on different layers, various portions of the orthographic projection of the coupling lines 120 of detection lines on the base substrate and various corresponding portions of the orthographic projection of the coupling lines 220 of data lines on the base substrate are arranged in parallel in a staggered manner to save a wiring space, namely, the coupling lines 120 of detection lines and the coupling lines 220 of data lines are not arranged linearly completely and have bent portions, but the corresponding linear portions of the coupling lines 120 of detection lines and the coupling lines 220 of data lines are parallel in a staggered manner, for example, as shown in FIG. 12, the coupling lines 120 of detection lines arranged in the vertical direction and the coupling lines 220 of data lines arranged in the vertical direction are parallel and are successively arranged in a staggered manner, namely, the arrangement sequence is as follows: one coupling line 120 of detection line, one coupling line 220 of data line, one coupling line 120 of detection line . . . , where one coupling line 220 of data line is inserted between every two adjacent coupling lines 120 of detection lines, one coupling line 120 of detection line is inserted between every two adjacent coupling lines 220 of data lines, and by the arrangement mode, the circumstances that loading is possibly caused between two lines, and then mura of display frames is caused when the projections of the coupling lines of detection lines and the coupling lines of data lines are overlapped can be avoided.

Figure 13:
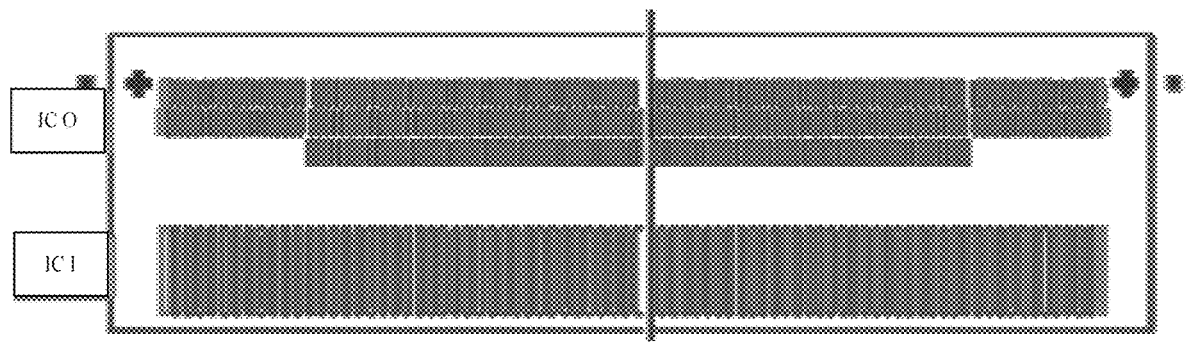
FIG. 13 is a schematic diagram of a circuit wiring structure of a binding area in the touch display panel according to the embodiment of the present disclosure.

In specific implementation, referring to FIG. 13, the IC includes an input portion (IC I) coupled with a periphery such as a flexible circuit board, and an output portion (IC 0) coupled with the touch display panel, where pins for providing signals for fingerprint recognition are arranged at two ends of the output portion.

Figure 14:
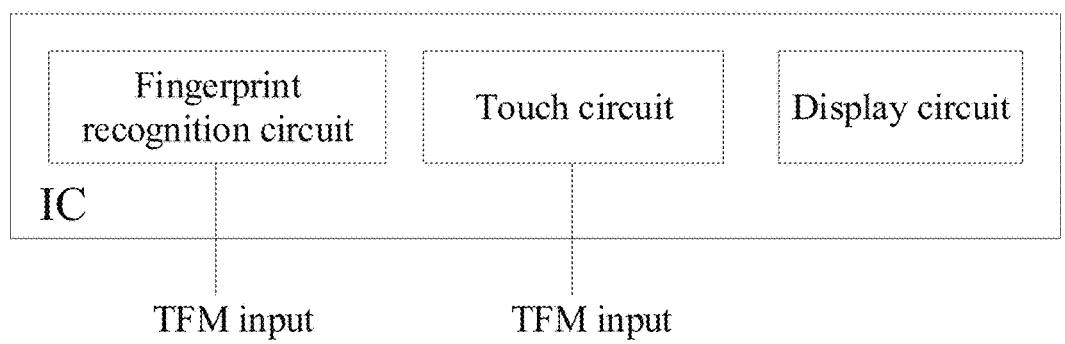
FIG. 14 is a schematic structural diagram of the touch display panel in which a fingerprint recognition circuit and a display circuit are arranged on the same IC according to the embodiment of the present disclosure.
Figure 15:
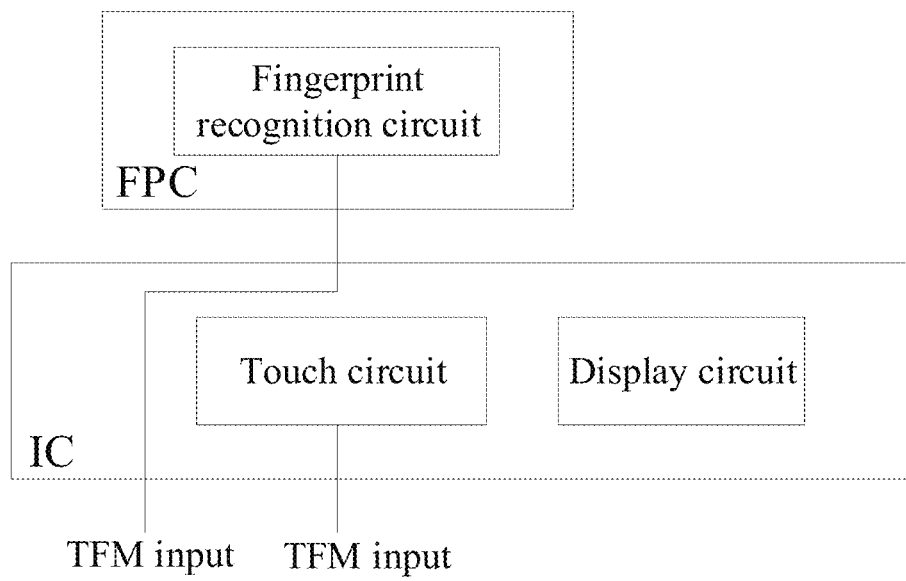
FIG. 15 is a schematic structural diagram of the touch display panel in which the fingerprint recognition circuit and the display circuit are arranged on different ICs according to the embodiment of the present disclosure.

At present, an IC internal touch integration technology has been mature. Fingerprint recognition can be implemented in two designs, in the first design, a fingerprint recognition function circuit is integrated in the IC, referring to FIG. 14, the IC includes a fingerprint recognition circuit, a touch circuit and a display circuit, where the detection lines (namely TFM) are coupled with a fingerprint recognition circuit and are also coupled with a touch circuit. In the second design, referring to FIG. 15, a fingerprint recognition circuit is designed on a flexible circuit board (FPC), and a touch circuit and a display circuit are arranged on the IC, namely a 2-chip solution.

Figure 16:
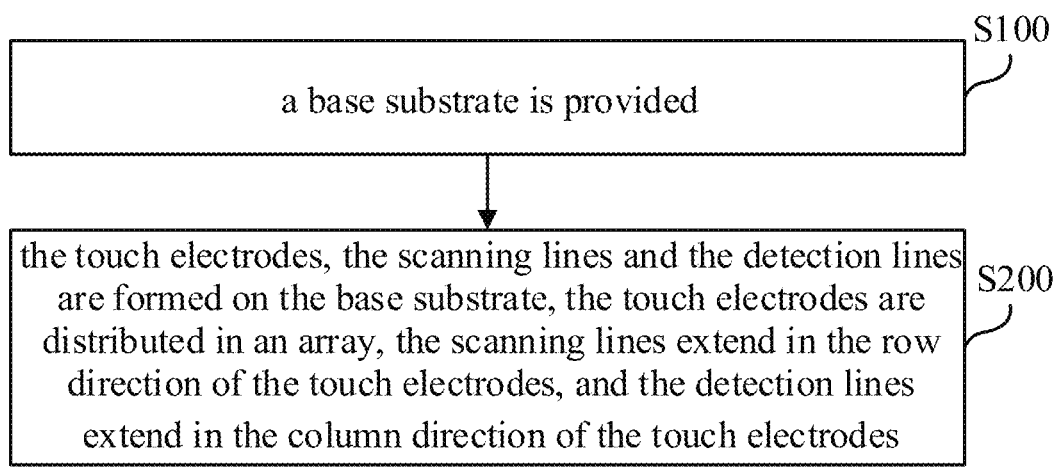
FIG. 16 is a schematic diagram of a manufacturing process of the touch display panel according to the embodiment of the present disclosure.

Based on the same inventive concept, the embodiment of the present disclosure also provides a manufacturing method for manufacturing the touch display panel provided by the embodiment of the present disclosure, and referring to FIG. 16, the manufacturing method includes:

Step S100, a base substrate is provided.

Step S200, the touch electrodes, the scanning lines and the detection lines are formed on the base substrate, the touch electrodes are distributed in an array, the scanning lines extend in the row direction of the touch electrodes, and the detection lines extend in the column direction of the touch electrodes.

Figure 17:
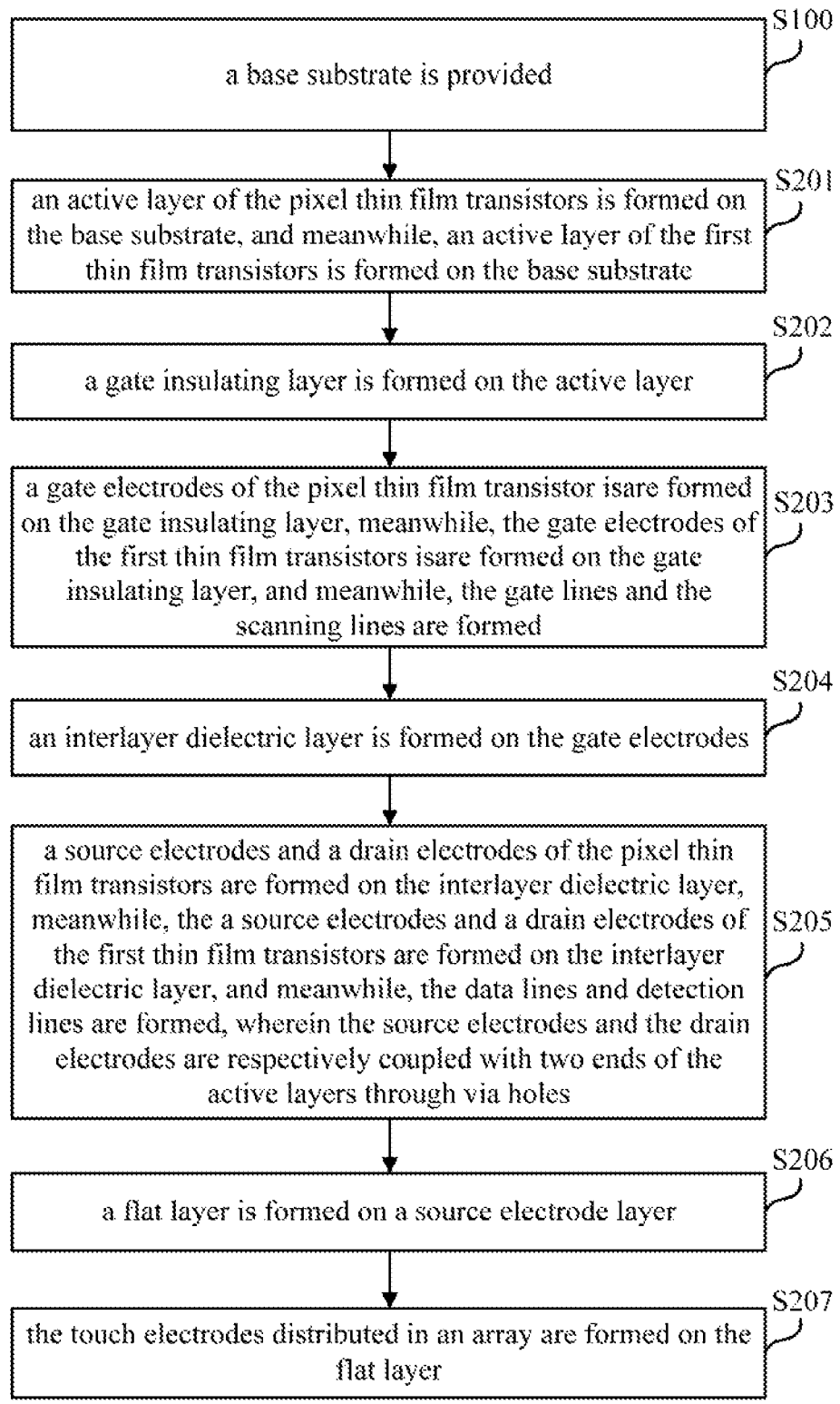
FIG. 17 is a schematic diagram of a specific manufacturing process of the touch display panel according to the embodiment of the present disclosure.

In specific implementation, with regard to step S200, the touch electrodes distributed in an array are formed on the base substrate, the scanning lines extending in the row direction of the touch electrodes are formed, and the detection lines extending in the line direction of the touch electrodes are formed, referring to FIG. 17, the step can specifically include:

Step S201, an active layer of the pixel thin film transistor is formed on the base substrate, and meanwhile, an active layer of the first thin film transistor is formed on the base substrate.

Step S202, a gate insulating layer is formed on the active layer.

Step S203, a gate electrode of the pixel thin film transistor is formed on the gate insulating layer, meanwhile, the gate electrode of the first thin film transistor is formed on the gate insulating layer, and meanwhile, the gate lines and the scanning lines are formed.

Step S204, an interlayer dielectric layer is formed on the gate electrodes.

Step S205, a source electrode and a drain electrode of the pixel thin film transistor are formed on the interlayer dielectric layer, meanwhile, a source electrode and a drain electrode of the first thin film transistor are formed on the interlayer dielectric layer, and meanwhile, the data lines and detection lines are formed, where the source electrodes and the drain electrodes are respectively coupled with two ends of the active layers through via holes.

Step S206, a flat layer is formed on a source electrode layer.

Step S207, the touch electrodes distributed in an array are formed on the flat layer.

In order to more clearly understand the manufacturing method of the touch display panel provided by the embodiment of the present disclosure, and the circumstance that the detection lines are arranged on the data lines is taken as an example, which will be explained in detail below with reference to FIG. 18 to FIG. 28.

Figure 18:
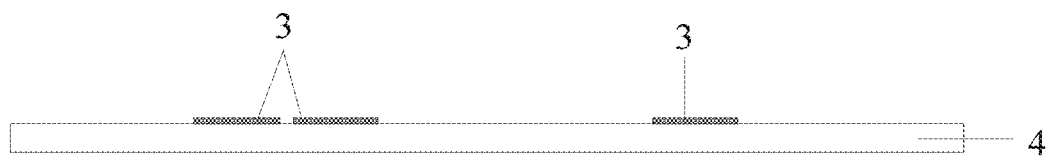
FIG. 18 is a schematic structural diagram of the touch display panel after a light shielding layer is prepared according to the embodiment of the present disclosure.

Step 1, a metal film layer (LS Dep) is deposited on a glass substrate 4, and patterned light shielding layers 3 are formed through processes such as masking (LS Mask), etching (LS Strip) and the like, so that irradiation of external light on the subsequently formed active layer is avoided, and the performance of a semiconductor of the active layer is not influenced. The material of the light shielding layer 3 can be specifically metal Mo, and the structural diagram of the touch display panel with the light shielding layers 3 is shown in FIG. 18.

Figure 19:
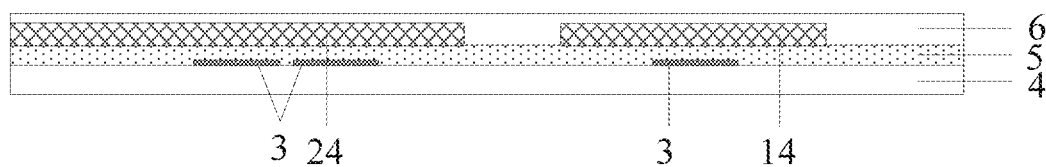
FIG. 19 is a schematic structural diagram of the touch display panel after a gate insulating layer is prepared according to the embodiment of the present disclosure.

Step 2, a buffer layer 5 is formed on the light shielding layers 3, a semiconductor film layer (a-Si Dep, where the semiconductor film layer can specifically include SiNx/SiOx/a-Si in sequence) is deposited on the buffer layer 5, and the semiconductor film layer is subjected to processes including dehydrogenation, laser annealing (ELA), masking (ACT Mask), etching (ACT Etch), doping (Vth Doping, where the material of doping can be BF3 specifically), stripping (ACT Strip) and the like in sequence to form a patterned active layer, the active layer may specifically include an active layer 24 of the pixel thin film transistor, and an active layer 14 of the first thin film transistor, a gate insulating layer 6 (GI Dep, where the material of the gate insulating layer 6 can include SiOx/SiNx) is formed on the active layer, and the structural diagram of the touch display panel with the gate insulating layer is shown in FIG. 19.

Figure 20:
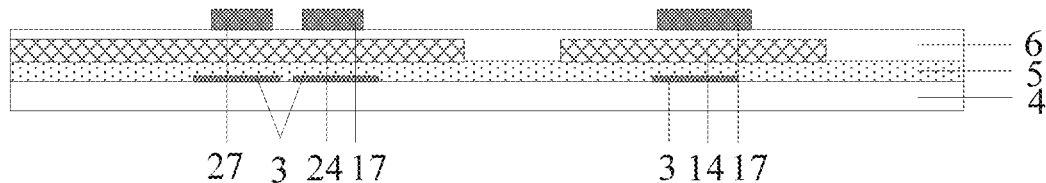
FIG. 20 is a schematic structural diagram of the touch display panel after gate electrodes are prepared according to the embodiment of the present disclosure.

Step 3, a gate metal film layer (Gate Dep, where the material of the gate metal film layer can be specifically Mo) is deposited, a patterned gate electrode layer is formed through processes including masking (Gate Mask), etching (Gate Etch), gate doping (Gate Doping can be specifically N-type doping), ion implantation (LDD), stripping (Gate Strip) and the like sequentially, the gate electrode layer includes a gate electrode 27 of the pixel thin film transistor and a gate electrode 17 of the first thin film transistor, gate lines 21 and scanning lines 11, where the pixel thin film transistor can be of a two-gate structure specifically, and a structural diagram of the touch display panel with the gate electrode layer is shown in FIG. 20.

Figure 21:
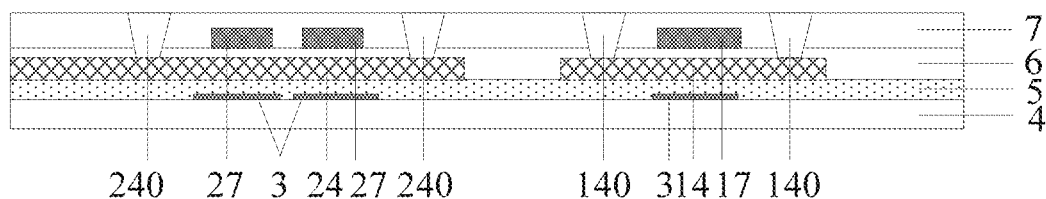
FIG. 21 is a schematic structural diagram of the touch display panel after an interlayer dielectric layer is prepared according to the embodiment of the present disclosure.

Step 4, an interlayer dielectric layer 7 (ILD Dep, where the material of the interlayer dielectric layer is SiNx/SiOx specifically) is formed on the gate electrode layer, via holes 240 exposing two ends of the active layer 24 of the pixel thin film transistor and via holes 140 exposing two ends of the active layer 14 of the first thin film transistor are formed through processes including hydrogenation activation, masking (ILD Mask), etching (ILD Etch), stripping (ILD Strip) and the like sequentially, and the structural diagram of the touch display panel with the interlayer dielectric layer is shown in FIG. 21.

Figure 22:
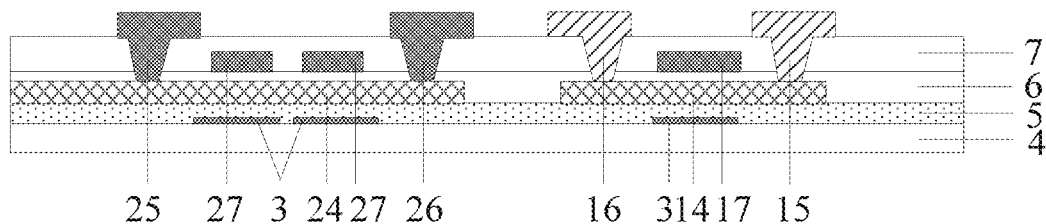
FIG. 22 is a schematic structural diagram of the touch display panel after a source and drain electrode layer is prepared according to the embodiment of the present disclosure.

Step 5, source and drain electrode metal film layers (SD Dep, where the material of the source and drain electrode metal film layers can be Ti/Al/Ti specifically) are deposited, and patterned source and drain electrode layers are formed through processes including masking (SD Mask), etching (SD Etch), stripping (SD Strip) and the like sequentially, where the patterned source and drain electrode layers include the source electrode 26 of the pixel thin film transistor, the drain electrode 25 of the pixel thin film transistor, the data lines 22, the source electrode 16 of the first thin film transistor and the drain electrode 15 of the first thin film transistor, and the touch display panel with the source and drain electrode layers is shown in FIG. 22.

Figure 23:
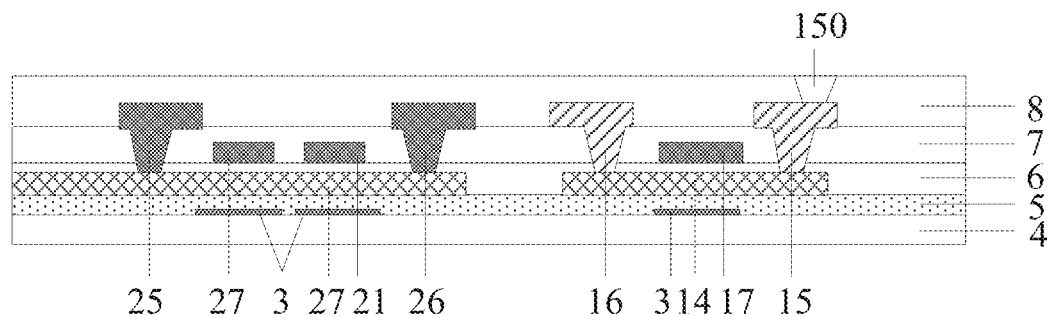
FIG. 23 is a schematic structural diagram of the touch display panel after a flat layer is prepared according to the embodiment of the present disclosure.

Step 6, a flat layer 8 is formed on the source and drain electrode layers through a mask plate, and the flat layer 8 is sequentially subjected to masking (PLN Mask), drying (PLN Oven) and photoresist removing (PLN Descum) treatment to form via holes 150 exposing the drain electrode 15 of the first thin film transistor, and the structural diagram of the touch display panel after the flat layer is formed is shown in FIG. 23.

Figure 24:
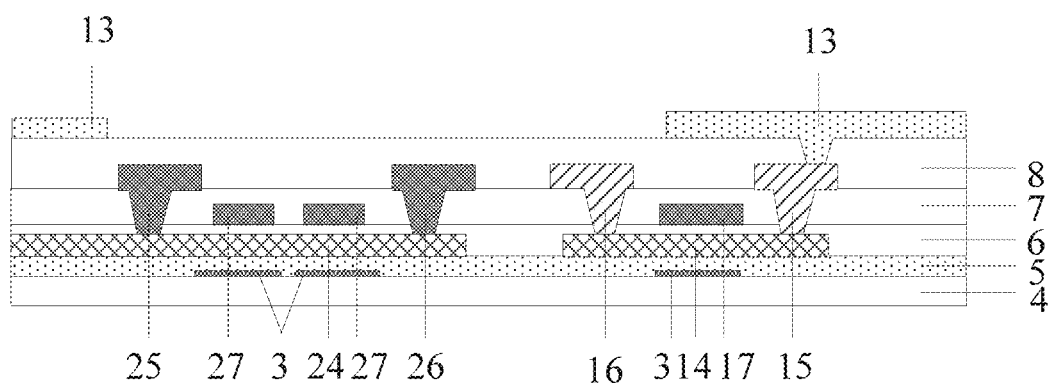
FIG. 24 is a schematic structural diagram of the touch display panel after touch electrodes are prepared according to the embodiment of the present disclosure.

Step 7, a touch electrode film layer (C-ITO Dep, where the material of the touch electrode film layer can be ITO specifically) is formed on the flat layer 8, and the patterned touch electrode layer is formed by sequentially carrying out processes including masking (C-ITO Mask), etching (C-ITO Etch), stripping (C-ITO Strip) and the like sequentially on the touch electrode film layer, where the touch electrode layer includes the touch electrodes 13, and the touch display panel with the touch electrodes 13 is shown in FIG. 24.

Figure 25:
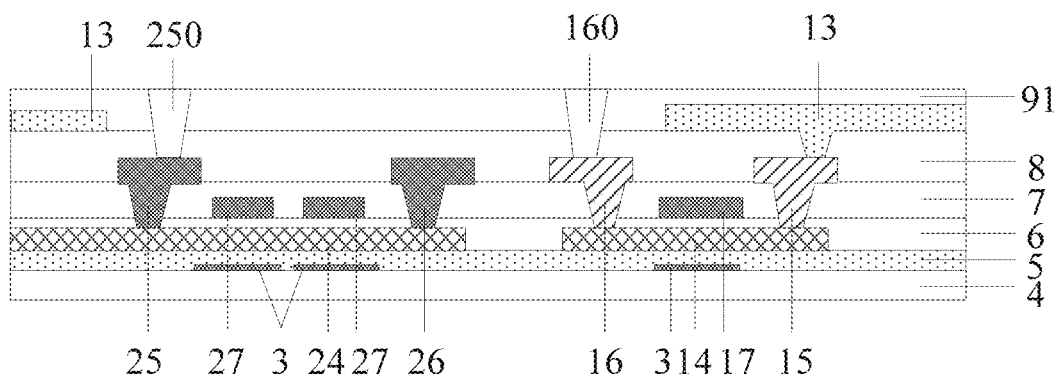
FIG. 25 is a schematic structural diagram of the touch display panel after a first passivation layer is prepared according to the embodiment of the present disclosure.

Step 8, a first passivation layer 91 (PVX1 Dep) is formed on the touch electrode layer, a via hole 160 exposing the source electrode 16 of the first thin film transistor and a via hole 250 exposing the drain electrode 25 of the pixel thin film transistor are formed through processes of masking (PVX1 Mask), etching (PVX1 Etch), stripping (PVX1 Strip) and the like sequentially, a structural diagram of the touch display panel with the first passivation layer 91 is shown in FIG. 25.

Figure 26:
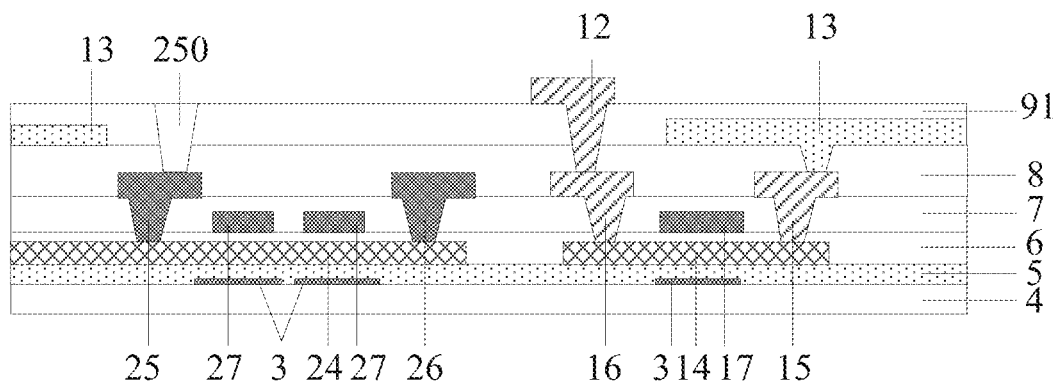
FIG. 26 is a schematic structural diagram of the touch display panel after detection lines are prepared according to the embodiment of the present disclosure.

Step 9, a detection line metal film layer (TFM Dep, where the material of the detection line metal film layer can be Ti/Al/Ti specifically) is deposited, and a plurality of detection lines 12 extending in the column direction of the touch electrodes are formed through processes including masking (TFM Mask), etching (TFM Etch), stripping (TFM Strip) and the like sequentially, and the structural diagram of the touch display panel with the detection lines is shown in FIG. 26.

Figure 27:
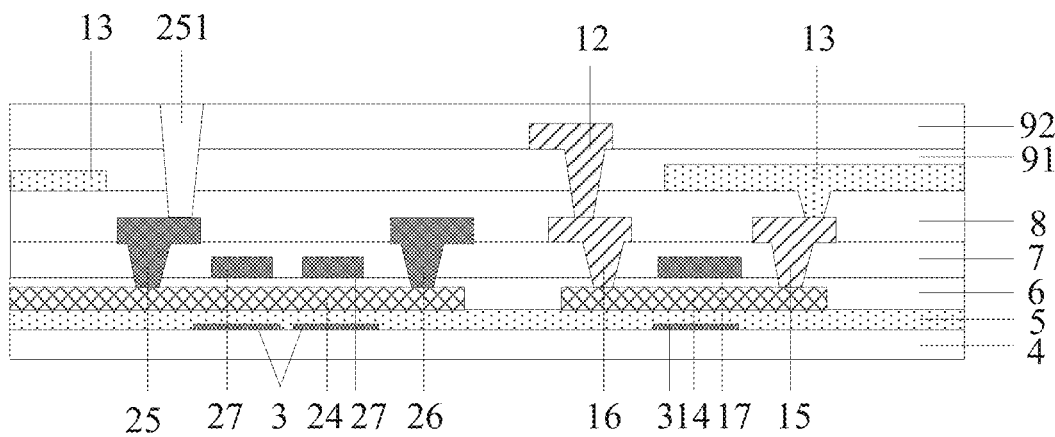
FIG. 27 is a schematic structural diagram of the touch display panel after a second passivation layer is prepared according to the embodiment of the present disclosure.

Step 10, a second passivation layer 92 (PVX2 Dep) is formed on the detection lines 12, and a via hole 251 exposing the drain electrode 25 of the pixel thin film transistor is formed through processes of masking (PVX2 Mask), etching (PVX2 Etch), stripping (PVX2 Strip) and the like, and the structural diagram of the touch display panel with the second passivation layer is shown in FIG. 27.

Figure 28:
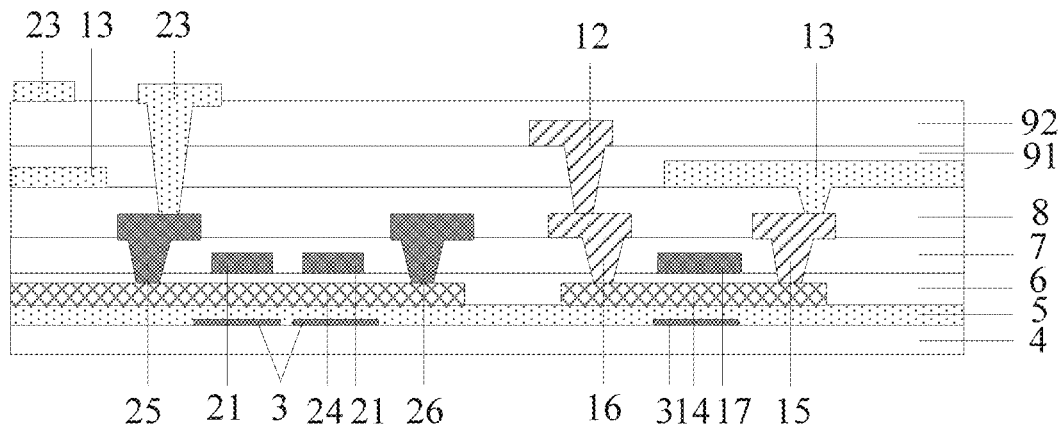
FIG. 28 is a schematic structural diagram of the touch display panel after a pixel electrode layer is prepared according to the embodiment of the present disclosure.

Step 11, a pixel electrode film layer (P-ITO Dep, where the material of the pixel electrode film layer can be ITO) is formed on the second passivation layer 92, and a patterned pixel electrode layer is formed through processes including masking (P-ITO Mask), etching (P-ITO Etch), photoresist removing (P-ITO Descum), stripping (C-ITO Strip), annealing (P-ITO Anneal) and the like sequentially, where the pixel electrode layer includes pixel electrodes 23, and the structural diagram of the touch display panel with the pixel electrodes is shown in FIG. 28.

The embodiment of the present disclosure has the following beneficial effects: the touch display panel provided by the embodiment of the present disclosure includes the touch electrodes which are distributed in an array and are multiplexed as the common electrodes, the scanning lines extending in the row direction of the touch electrodes, the detection lines extending in the column direction of the touch electrodes and the first control circuits which are in one-to-one correspondence to the touch electrodes; where, when the scanning lines are used for displaying, the first control signal is input to the first control circuits, the detection lines input the common voltage signal to the touch electrodes through the first control circuits when the first control signal is input to the first control circuits, the scanning lines are further used for inputting the second control signal to the first control circuits row by row during fingerprint recognition or touch, the detection lines input the touch signal to the touch electrodes through the first control circuits when the second control signal is input to the first control circuits, the detection signal detected by the touch electrodes is transmitted to the external circuit, thus, during displaying, the touch electrodes can be used as the common electrodes, during fingerprint recognition or touch, the scanning lines input the second control signal to the first control circuits row by row, the detection lines input the touch signal to the touch electrodes when the second control signal is input to the first control circuits, namely, the touch electrodes are charged row by row; when the user touches the screen with fingers, the signal of the touch electrodes changes, the changed signal is transmitted to the external circuit through the detection lines, thus, a touch position can be determined and a fingerprint pattern can further be determined according to the column where the touch electrodes with signal changing are located and the row of the scanned touch electrodes corresponding to the time when the signal changes, fingerprint recognition and touch are integrated in the display panel, and the integration level is high.

It will be apparent to those skilled in the art that various changes and modifications may be made to the present disclosure without departing from the spirit and scope of the disclosure. Thus, it is intended that the present disclosure also encompass such modifications and variations as fall within the scope of the claims and their equivalents.

What is claimed is:

1. A touch display panel, comprising:
   a common electrode layer, comprising a plurality of touch electrodes arranged in an array;
   a plurality of scanning lines, extending in a row direction of the touch electrodes;
   a plurality of detection lines, extending in a column direction of the touch electrodes;
   a plurality of first thin film transistors, wherein the first thin film transistors are in one-to-one correspondence to the touch electrodes, a drain electrode of each of the first thin film transistors is coupled with a corresponding touch electrode, a gate electrode of the each first thin film transistor is coupled with one of the scanning lines, and a source electrode of the each first thin film transistor is coupled with one of the detection lines;
   a first gate driving circuit coupled with one end of each of the scanning lines;
   second thin film transistors which are in one-to-one correspondence to the scanning lines;
   a display enable signal line; and
   a common voltage signal line;
   wherein a drain electrode of each of the second thin film transistors is coupled with one of the scanning lines, a gate electrode of the each second thin film transistor is coupled with the display enable signal line, and a source electrode of the each second thin film transistor is coupled with the common voltage signal line;
   wherein the first gate driving circuit is arranged on a same side of each of the scanning lines,
   the each second thin film transistor is arranged on an other side of the each scanning line; and
   an extending direction of the display enable signal line and an extending direction of the common voltage signal line are the same as an extending direction of each of the detection lines.

2. The touch display panel according to claim 1, further comprising:
   a plurality of pixel electrodes distributed in an array;
   pixel thin film transistors which are in one-to-one correspondence to the pixel electrodes and
   a plurality of data lines and a plurality of gate lines;
   wherein a drain electrode of each of the pixel thin film transistors is coupled with a corresponding pixel electrode, a gate electrode of the each pixel thin film transistor is coupled with one of the gate lines, and a source electrode of the each pixel thin film transistor is coupled with one of the data lines.

3. The touch display panel according to claim 2, further comprising:
   a second gate driving circuit coupled with one end of each of the gate lines;
   third thin film transistors which are in one-to-one correspondence to the gate lines; and
   a touch enable signal line;
   wherein a drain electrode of each of the third thin film transistors is coupled with one of the gate lines, a gate electrode of the each third thin film transistor is coupled with the touch enable signal line, and a source electrode of the each third thin film transistor is coupled with the common voltage signal line.

4. The touch display panel according to claim 3, wherein the second gate driving circuit and the first gate driving circuit are arranged on a same side of the each scanning line and the each gate line, the each second thin film transistor and the each third thin film transistor are arranged on an other side of the each scanning line and the each gate line, and an extending direction of the touch enable signal line is the same as an extending direction of each of the detection lines.

5. The touch display panel according to claim 4, wherein the first gate driving circuit and the second gate driving circuit are a same gate driving circuit; a fourth thin film transistor is arranged between the gate driving circuit and the each gate line, and a fifth thin film transistor is arranged between the gate driving circuit and the each scanning line;
   a gate electrode of each of the fourth thin film transistors is coupled with a first signal source, a source electrode of the each fourth thin film transistor is coupled with the gate driving circuit, and a drain electrode of the each fourth thin film transistor is coupled with the gate line; and
   a gate electrode of each of the fifth thin film transistors is coupled with a second signal source, a source electrode of the each fifth thin film transistor is coupled with the gate driving circuit, and a drain electrode of the each fifth thin film transistor is coupled with the scanning line.

6. The touch display panel according to claim 3, wherein the first gate driving circuit and the second gate driving circuit are separately arranged on two sides of each of the scanning lines and each of the gate lines.

7. The touch display panel according to claim 2, wherein one touch electrode corresponds three adjacent pixel electrodes in a row.

8. The touch display panel according to claim 2, wherein an extending direction of the gate lines is the same as an extending direction of the scanning lines, the gate lines and the scanning lines are arranged on a same layer, and one of the gate lines and a corresponding scanning line are arranged in a same row gap; and an extending direction of the data lines is the same as an extending direction of the detection lines, and the data lines and the detection lines are arranged on a same layer, or the detection lines are arranged on a layer where the data lines are arranged.

9. The touch display panel according to claim 8, wherein the layer where the detection lines are arranged is arranged between the layer where the data lines are arranged and the common electrode layer, and one of the detection lines covers a corresponding data line.

10. The touch display panel according to claim 8, wherein for one scanning line and a corresponding gate line which are arranged in the same row gap, the touch electrode corresponding to a first thin film transistor coupled with a scanning line and the pixel electrode corresponding to a pixel thin film transistor coupled with a gate line are not overlapped to each other.

11. A display device, comprising the touch display panel according to claim 1.

12. A driving method of the touch display panel according to claim 1, wherein the driving method comprises:

in a display stage, switching on each of the first thin film transistors through each of the scanning lines simultaneously, and loading a common voltage signal to each of the touch electrodes through each of the detection lines simultaneously; and in a fingerprint recognition or a touch stage, switching on the each first thin film transistor row by row through the each scanning line, loading a touch signal to each of the touch electrodes through the each detection line, and transmitting a detection signal detected by the each touch electrode to an external circuit.

13. The driving method according to claim 12, wherein the driving method further comprises:

in the display stage, switching on each second thin film transistor through the display enable signal line simultaneously, and loading a high-level signal to the each scanning line through a common voltage signal line simultaneously; and in the fingerprint recognition or the touch stage, switching off the each second thin film transistor through a display enable signal line simultaneously.

14. The driving method according to claim 12, wherein the driving method further comprises:

in the display stage, switching on each pixel thin film transistor row by row through each gate line, and loading a data signal to each pixel electrode through each data line simultaneously; and in the fingerprint identification or the touch stage, switching off the each pixel thin film transistor through the each gate line simultaneously.

15. The driving method according to claim 14, wherein the driving method further comprises:

in the display stage, switching off each third thin film transistor through a touch enable signal line simultaneously; and in the fingerprint recognition or the touch stage, switching on the each third thin film transistor through the touch enable signal line simultaneously, and loading a low-level signal to the each gate line through the common voltage signal line simultaneously.

16. The driving method according to claim 14, wherein the driving method further comprises:

in the display stage, switching on each fourth thin film transistor through a first signal source simultaneously, and switching off each fifth thin film transistor through a second signal source simultaneously; and in the fingerprint recognition or the touch stage, switching off the each fourth thin film transistor through the first signal source simultaneously, and switching on the each fifth thin film transistor through the second signal source simultaneously.

\* \* \* \* \*